United States Patent [19]

Suzuki

[11] Patent Number: 5,222,108
[45] Date of Patent: Jun. 22, 1993

[54] CELL TRANSMISSION PHASE AND RATE CONVERTING CIRCUIT CAPABLE OF MINIMIZING EXTENSION OF FAULTS

[75] Inventor: Toshio Suzuki, Tokyo, Japan

[73] Assignee: NEC Corporation, Tokyo, Japan

[21] Appl. No.: 810,034

[22] Filed: Dec. 19, 1991

[30] Foreign Application Priority Data

Dec. 20, 1990 [JP] Japan .................................. 2-412533

[51] Int. Cl.[5] ............................................. H04L 3/02
[52] U.S. Cl. ................................... 375/118; 370/105.3
[58] Field of Search ....................... 375/118, 111, 112; 370/105.3, 102, 94.1

[56] References Cited

U.S. PATENT DOCUMENTS

| | | | |
|---|---|---|---|
| 5,091,907 | 2/1992 | Wettengel | 370/102 |
| 5,119,406 | 6/1992 | Kramer | 375/118 |
| 5,132,970 | 7/1992 | Urbansky | 370/102 |

Primary Examiner—Curtis Kuntz
Assistant Examiner—Tesfaldet Bocure
Attorney, Agent, or Firm—Sughrue, Mion, Zinn, Macpeak & Seas

[57] ABSTRACT

In a cell transmission phase and rate converting circuit for use in an ATM communication system, an internal write-in pulse generator (41) generates an internal write-in pulse sequence (IWP) having a predetermined write-in period on the basis of each cell phase pulse of an external write-in pulse sequence (EWP) although any cell phase pulse of the external write-in pulse sequence (EWP) is not supplied thereto. An internal read-out pulse generator (51) generates an internal read-out pulse sequence (IRP) having a predetermined read-out period on the basis of each cell phase pulse of an external read-out pulse sequence (ERP) although any cell phase pulse of the external read-out pulse sequence (ERP) is not supplied thereto. A main control unit (12a) controls an FIFO buffer (11) to write a write-in cell data (WCD) into the FIFO buffer (11) as held cell data in response to a write-in clock signal (WCK) and the internal write-in pulse sequence (IWP) and to read the held cell data out of the FIFO buffer (11) as read-out cell data (RCD) in response to a read-out clock signal (RCK) and the internal read-out pulse sequence (IRP).

3 Claims, 8 Drawing Sheets

CELL TRANSMISSION PHASE AND RATE CONVERTING CIRCUIT CAPABLE OF MINIMIZING EXTENSION OF FAULTS

BACKGROUND OF THE INVENTION

This invention relates to a cell transmission phase and rate converting circuit for converting input cell data having an input phase into output cell data having an output phase which is different from the input phase.

A conventional cell transmission phase and rate converting circuit of the type described is for use in an asynchronous transfer mode (ATM) communication system for carrying out transmission and exchange of cells between first and second ATM circuits. The first ATM circuit is operable in accordance with a first clock signal and a first cell phase pulse sequence. The second ATM circuit is operable in accordance with a second clock signal and a second cell phase pulse sequence which are independent of the first clock signal and the first cell phase pulse sequence, respectively. Each of the first and the second cell phase sequences comprises a sequence of cell phase pulses. The first and the second cell phase pulse sequences have first and second periods, respectively. Each of the cells is a packet having a fixed bit length. The first ATM circuit produces, as first cell data, the cells in synchronism with the first clock signal and the first cell phase pulse sequence. The second ATM circuit receives, as second cell data, the cells in synchronism with the second clock signal and the second cell phase pulse sequence. The cell transmission phase and rate converting circuit is connected between the first and the second ATM circuits. The cell transmission phase and rate converting circuit is supplied with the first cell data as the input cell data to produce the second cell data as the output cell data.

More particularly, the cell transmission phase and rate converting circuit is supplied with the first clock signal and the first cell phase pulse sequence by the first ATM circuit as a write-in clock signal and an external write-in pulse sequence, respectively. In addition, the cell transmission phase and rate converting circuit is supplied with the second clock signal and the second cell phase pulse sequence by the second ATM circuit as a read-out clock signal and an external read-out pulse sequence, respectively. The conventional cell transmission phase and rate converting circuit comprises a buffer which is supplied with said input cell data as a write-in cell data and which produces a read-out cell data as the output cell data. The buffer holds the write-in cell data as held cell data to produce the held cell data as the read-out cell data. The conventional cell transmission phase and rate converting circuit further comprises a main control unit for controlling the buffer to write the write-in cell data into the buffer as the held cell data in response to the write-in clock signal and the external write-in pulse sequence and to read the held cell data out of the buffer as the read-out cell data in response to the read-out clock signal and the external read-out pulse sequence.

The conventional cell transmission phase and rate converting circuit is normally operable on the assumption that security is stationarily made as regards all of the write-in clock signal, the external write-in pulse sequence, the read-out clock signal, and the external read-out pulse sequence and the fixed bit length of the cell. Such security is not made in cases, for example, where any miss occurs in any one of the write-in clock signal, the external write-in pulse sequence, the read-out clock signal, and the external read-out pulse sequence by malfunction of the first and/or the second ATM circuits and/or where any pseudo pulse generates by mixing of a noise. Under the circumstances, any phase shift occurs on writing and/or reading of the cells. As a result, the conventional cell transmission phase and rate converting circuit is disadvantageous in that excess data remains in the buffer.

In addition, the remained excess data causes a phase shift between the external read-out pulse sequence and the output cell data. The conventional cell transmission phase and rate converting circuit is defective in that it is impossible to autonomously detect occurrence of such a primary fault.

Another fault, such as an overflow or an underflow, which the control unit does not detect, occurs in the buffer as a secondary fault. In order to correct the secondary fault, it is necessary that the control unit initializes the buffer. Accordingly, the conventional cell transmission phase and rate converting circuit is disadvantageous in that such an initialization causes the buffer to discard other normal cell data and operation of the first and the second ATM circuits stops during the initialization.

SUMMARY OF THE INVENTION

It is an object of this invention to provide a cell transmission phase and rate converting circuit which is capable of minimizing extension of faults.

It is another object of this invention to provide a cell transmission phase and rate converting circuit of the type described, which is capable of automatically recovering from some malfunctions after resumption of its normal conditions although an external write-in pulse sequence and/or an external read-out pulse sequence are supplied for an abnormal period.

Other objects of this invention will become clear as the description proceeds.

On describing the gist of an aspect of this invention, it is possible to understand that a cell transmission phase and rate converting circuit is for use in an asynchronous transfer mode communication system for carrying out transmission and exchange of cells between first and second asynchronous transfer mode circuits. The first asynchronous transfer mode circuit is operable in accordance with a first clock signal and a first cell phase pulse sequence. The second asynchronous transfer mode circuit is operable in accordance with a second clock signal and a second cell phase pulse sequence which are independent of the first clock signal and the first cell phase pulse sequence, respectively. Each of the first and the second cell phase pulse sequences comprises a sequence of cell phase pulses. The first and the second cell phase pulse sequences have first and second periods, respectively. Each of the cells is a packet having a fixed bit length. The first asynchronous transfer mode circuit produces, as first cell data, the cells in synchronism with the first clock signal and the first cell phase pulse sequence. The second asynchronous transfer mode circuit receives, as second cell data, the cells in synchronism with the second clock signal and the second cell phase pulse sequence. The cell transmission phase and rate converting circuit is supplied with the first cell data as input cell data to produce the second cell data as output cell data. The cell transmission phase and rate converting circuit is supplied with the first clock signal and the first cell phase pulse sequence by the first asynchronous transfer mode circuit as a write-in clock signal and an external write-in pulse sequence, respectively. The cell transmission phase and rate converting circuit is supplied with the second clock signal and the second cell phase pulse sequence by the second asynchronous transfer mode circuit as a read-out clock signal and an external read-out pulse sequence, respectively. The cell transmission phase and rate converting circuit comprises a buffer which is supplied with the input cell data as a write-in cell data and which produces a read-out cell data as the output cell data. The buffer holds the write-in cell data as held cell data to produce the held cell data as the read-out cell data.

According to an aspect of this invention, the above-understood cell transmission phase and rate converting circuit comprises internal write-in pulse generating means supplied with the external write-in pulse sequence and preset by each cell phase pulse of the external write-in pulse sequence for generating an internal write-in pulse sequence having a predetermined write-in period on the basis of each cell phase pulse of the external write-in pulse sequence although any cell phase pulse of the external write-in pulse sequence is not supplied to the internal write-in pulse generating means. Supplied with the external read-out pulse sequence and preset by each cell phase pulse of the external read-out pulse sequence, internal read-out pulse generating means generates an internal read-out pulse sequence having a predetermined read-out period on the basis of each cell phase pulse of the external read-out pulse sequence although any cell phase pulse of the external read-out pulse sequence is not supplied to the internal read-out pulse generating means. Connected to the internal write-in pulse generating means, the internal read-out pulse generating means, and the buffer and supplied with the write-in and the read-out clock signals, control means controls the buffer to write the write-in cell data into the buffer as the held cell data in response to the write-in clock signal and the internal write-in pulse sequence and to read the held cell data out of the buffer as the read-out cell data in response to the read-out clock signal and the internal read-out pulse sequence.

DESCRIPTION OF THE PREFERRED EMBODIMENT

Figure 1:
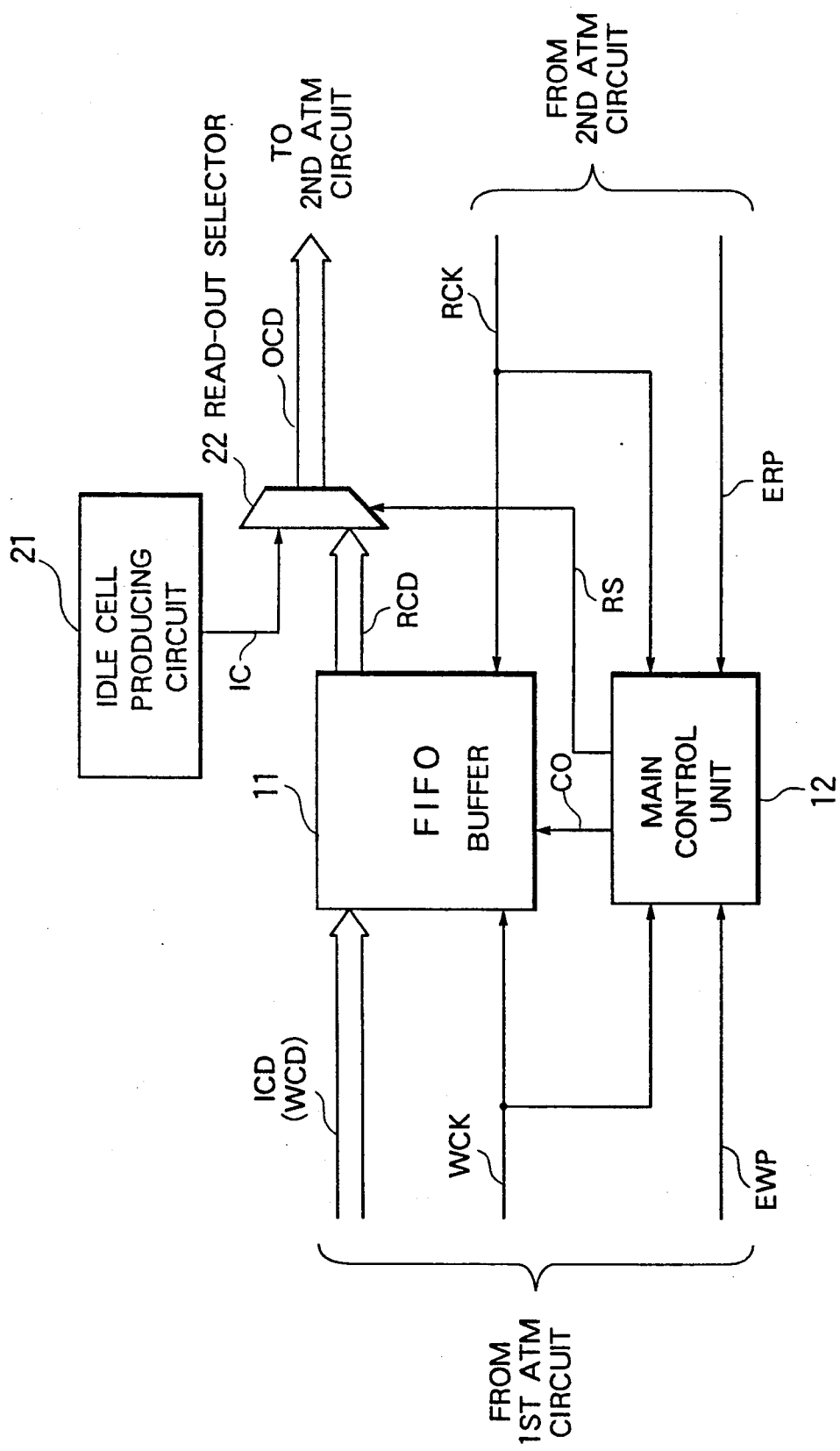
FIG. 1 is a block diagram of a conventional cell transmission phase and rate converting circuit.

Referring to FIG. 1, a conventional cell transmission phase and rate converting circuit will be described at first in order to facilitate an understanding of the present invention.

The cell transmission phase and rate converting circuit converts input cell data ICD having an input phase into output cell data OCD having an output phase which is different from the input phase.

The cell transmission phase and rate converting circuit is for use in an synchronous transfer mode (ATM) communication system for carrying out transmission and exchange of cells between first and second ATM circuits. The first ATM circuit is operable in accordance with a first clock signal and a first cell phase pulse sequence. The second ATM circuit is operable in accordance with a second clock signal and a second cell phase pulse sequence which are independent of the first clock signal and the first phase pulse sequence, respectively.

Each of the first and the second cell phase sequences comprises a sequence of cell phase pulses. The first and the second cell phase pulse sequences have first and second periods, respectively. Each of the cells is a packet having a fixed bit length. Each cell has a header field containing destination and control information and a payload field containing data information.

The first ATM circuit produces, as first cell data, the cells in synchronism with the first clock signal and the first cell phase pulse sequence. The second ATM circuit receives, as second cell data, the cells in synchronism with the second clock signal and the second cell phase pulse sequence.

The cell transmission phase and rate converting circuit is connected between the first and the second ATM circuits. The cell transmission phase and rate converting circuit is supplied with the first cell data as the input cell data ICD to produce the second cell data as the output cell data OCD.

More specifically, the cell transmission phase and rate converting circuit is supplied with the first clock signal and the first cell phase pulse sequence by the first ATM circuit as a write-in clock signal WCK and an external write-in pulse sequence EWP, respectively. In addition, the cell transmission phase and rate converting circuit is supplied with the second clock signal and the second cell phase pulse sequence by the second ATM circuit as a read-out clock signal RCK and an external read-out pulse sequence ERP, respectively.

The cell transmission phase and rate converting circuit comprises a first-in first-out (FIFO) buffer 11. The FIFO buffer 11 is supplied with the input cell data ICD as write-in cell data WCD. The FIFO buffer 11 holds the write-in cell data WCD as held cell data to produce the held cell data as a read-out cell data RCD.

The cell transmission phase and rate converting circuit further comprises a main control unit 12. The main control unit 12 is supplied with the write-in clock signal WCK, the external write-in pulse sequence EWP, the read-out clock signal RCK, and the external read-out pulse sequence ERP. The main control unit 12 controls the FIFO buffer 11 to write the write-in cell data WCD into the FIFO buffer 11 as the held cell data in response to the write-in clock signal WCK and the external write-in pulse sequence EWP and to read the held cell data out of the FIFO buffer 11 as the read-out cell data RCD in response to the read-out clock signal RCK and the external read-out pulse sequence ERP.

Figure 2:
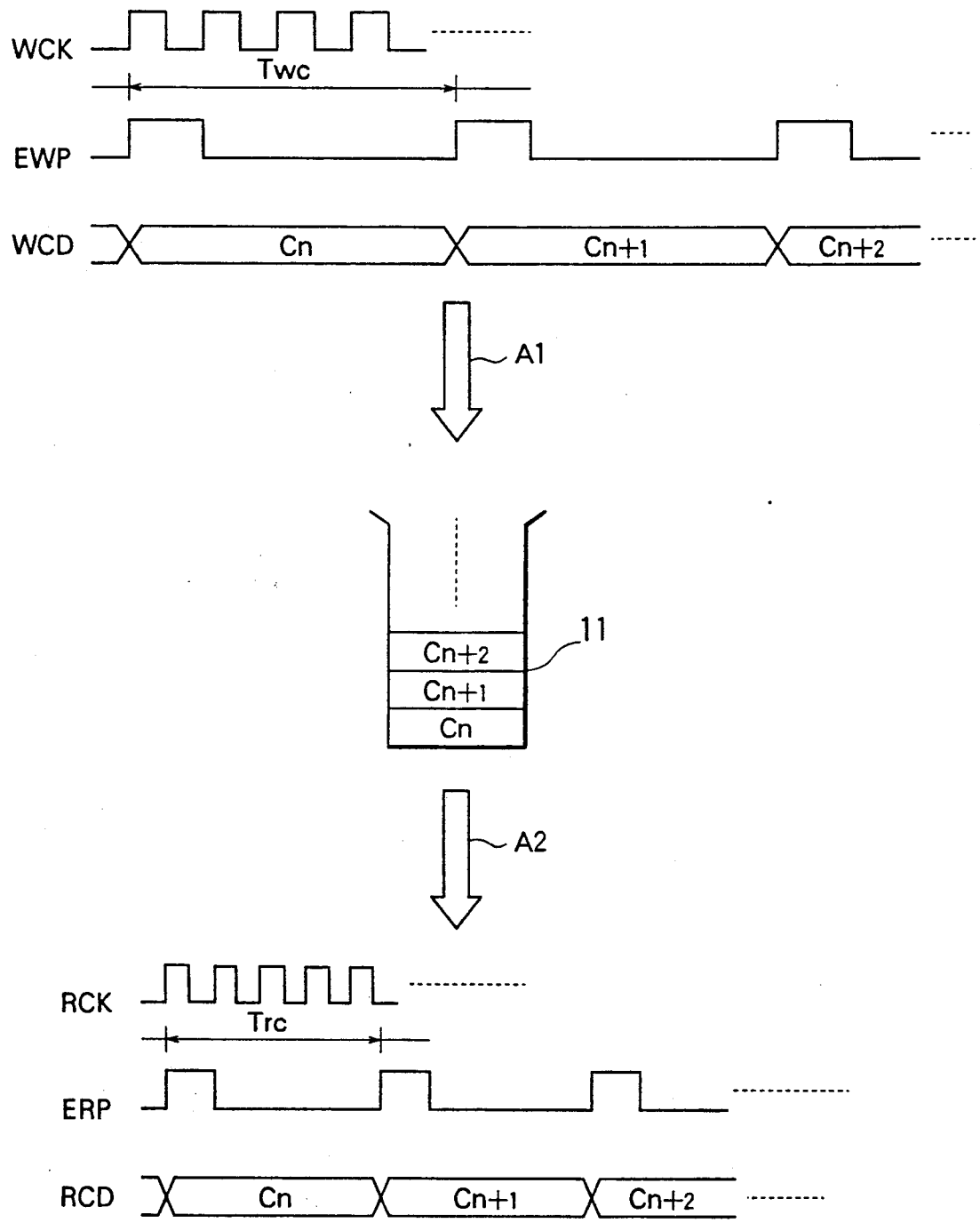
FIG. 2 shows a time chart for use in describing operation of the conventional cell transmission phase and rate converting circuit illustrated in FIG. 1.

Turning to FIG. 2, description will be made as regards operation of the conventional cell transmission phase and rate converting circuit as shown in FIG. 1. The write-in clock signal WCK, the external write-in pulse sequence EWP, and the write-in cell data WCD are depicted along first through third lines as labelled WCK, EWP, and WCD above a first open arrow A1 in FIG. 2. The FIFO buffer 11 is depicted below the first open arrow A1 and above a second open arrow A2. Below the second open arrow A2 in FIG. 2, the read-out clock signal RCK, the external read-out pulse sequence ERP, and the read-out cell data RCD are depicted along fourth through sixth lines as labelled RCK, ERP, and RCD.

The external write-in pulse sequence EWP or the first cell phase pulse sequence has the first period which is normally equal to a normal write-in period as depicted at Twc. The write-in cell data WCD comprises the cells as depicted at, for example, $C_n$, $C_{n+1}$, $C_{n+2}$, and so on. Each of cells of the write-in cell data WCD is defined by two adjacent cell phase pulses of the external write-in pulse sequence EWP. Each of cells of the write-in cell data WCD has the fixed bit length equal to, for example, a length of fifty-three bits.

Responsive to the write-in clock signal WCK and the external write-in pulse sequence EWP, the main control unit 12 controls the FIFO buffer 11 to write the write-in cell data WCD into the FIFO buffer 11 as the held cell data with the held cell data divided into the cells $C_n$, $C_{n+1}$, $C_{n+2}$, and so on as shown in FIG. 2.

The external read-out pulse sequence ERP or the second cell phase pulse sequence has the second period which is normally equal to a normal read-out period as depicted at Trc. Responsive to the read-out clock signal RCK and the external read-out pulse sequence ERP, the main control unit 12 controls the FIFO buffer 11 to read the held cell data out of the FIFO buffer 11 as the read-out cell data RCD comprising the cells $C_n$, $C_{n+1}$, $C_{n+2}$, and so on as shown in FIG. 2.

Turning back to FIG. 1, the main control unit 12 recognizes a write-in cell number from the write-in clock signal WCK and the external write-in pulse sequence EWP. In addition, the main control unit 12 recognizes a read-out cell number from the read-out clock signal RCK and the external read-out pulse sequence ERP. The main control unit 12 compares the write-in cell number with the read-out cell number to detect a held cell number equal to the number of the cells in the held cell data which is held in the FIFO buffer 11. When the held cell number is equal to zero, namely, when the held cell data or the read-out cell data RCD is absent from the FIFO buffer 11, the main control unit 12 produces a read-out selection signal RS.

The cell transmission phase and rate converting circuit further comprises an idle cell producing circuit 21 and a read-out selector 22. The idle cell producing circuit 21 produces idle cell data IC. The idle cell data IC is supplied to the read-out selector 22. The read-out selector 22 is also supplied with the read-out cell data RCD by the FIFO buffer 11. In response to the read-out selection signal RS, the read-out selector 22 selects one of the read-out cell data RCD and the idle cell data IC as the output cell data OCD. More particularly, the read-out selector 22 selects the read-out cell data RCD as the output cell data OCD when the read-out selection signal RS is absent. The read-out selector 22 selects the idle cell data IC as the output cell data OCD when the read-out selection signal RS is present. The output cell data OCD is delivered to the second ATM circuit.

It is assumed for the conventional cell transmission phase and rate converting circuit that security is stationarily made as regards all of the write-in clock signal WCK, the external write-in pulse sequence EWP, the read-out clock signal RCK, and the external read-out pulse sequence and the fixed bit length of the cell. In addition, it is necessary that the main control unit 12 initializes the FIFO buffer 11 by a control signal CO when an overflow or an underflow occurs in the FIFO buffer 11. As a result, the conventional cell transmission phase and rate converting circuit is defective in that it is impossible to minimize extension of any fault, as mentioned in the preamble of the instant specification.

Figure 3:
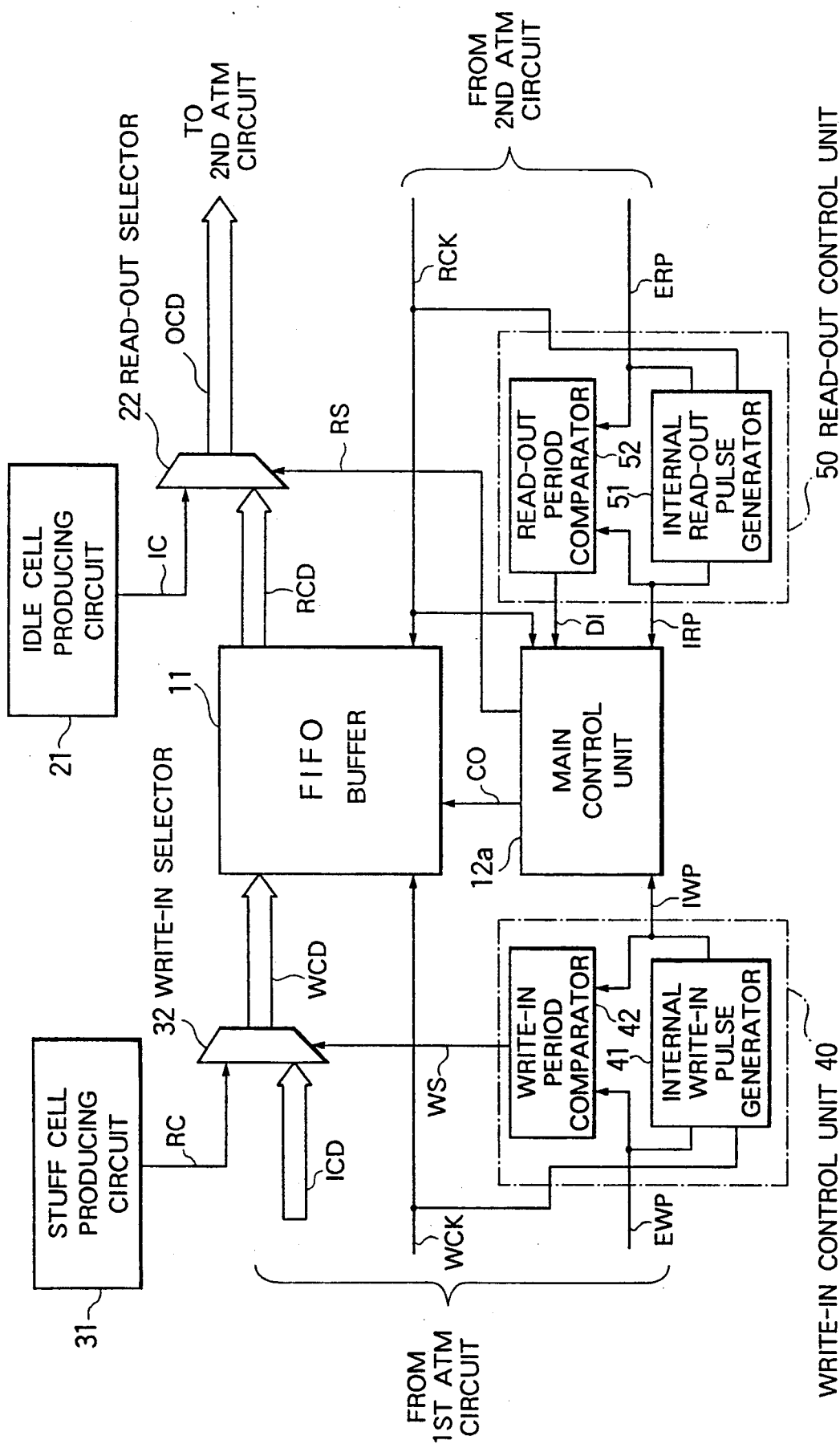
FIG. 3 is a block diagram of a cell transmission phase and rate converting circuit according to a preferred embodiment of the instant invention.

Referring to FIG. 3, the description will proceed to a cell transmission phase and rate converting circuit according to a preferred embodiment of this invention. The cell transmission phase and rate converting circuit is similar in structure and operation to the conventional cell transmission phase and rate converting circuit illustrated in FIG. 1 except that the cell transmission phase and rate converting circuit further comprises a stuff cell producing circuit 31, a write-in selector 32, a write-in control unit 40, and a read-out control unit 50, and the main control unit is modified. The main control unit is therefore depicted at 12a.

The write-in control unit 40 comprises an internal write-in pulse generator 41 and a write-in period comparator 42. The write-in pulse generator 41 is supplied with the write-in clock signal WCK and the external write-in pulse sequence EWP. The write-in pulse generator 41 is preset by each cell phase pulse of the external write-in pulse sequence EWP. The write-in pulse generator 41 generates an internal write-in pulse sequence IWP having a predetermined write-in period on the basis of each cell phase pulse of the external write-in pulse sequence EWP although any cell phase pulse of the external write-in pulse sequence EWP is not supplied thereto. When the external write-in pulse sequence EWP is normally or properly supplied to the internal write-in pulse generator 41, the predetermined write-in period is equal to the normal write-in period Twc. Instead of the external write-in pulse sequence EWP, the internal write-in pulse sequence IWP is supplied to the main control unit 12a.

The write-in period comparator 42 is supplied with the external write-in pulse sequence EWP and the internal write-in pulse sequence IWP. The write-in period comparator 42 compares the first period of the external write-in pulse sequence EWP with the predetermined write-in period of the internal write-in pulse sequence IWP. The write-in period comparator 42 produces a write-in selection signal WS when the first period is shorter than the predetermined write-in period. The write-in selection signal WS is delivered to the write-in selector 32.

The stuff cell producing circuit 31 produces stuff cell data RC. The stuff cell data RC is supplied to the write-in selector 32. The write-in selector 32 is also supplied with the input cell data ICD by the first ATM circuit. In response to the write-in selection signal WS, the write-in selector 32 selects one of the input cell data ICD and the stuff cell data RC as the write-in cell data RCD. More specifically, the write-in selector 32 selects the input cell data ICD as the write-in cell data RCD when the write-in selection signal WS is absent. The write-in selector 32 selects the stuff cell data RC as the write-in cell data RCD when the write-in selection signal WS is present.

The read-out control unit 50 comprises an internal read-out pulse generator 51 and a read-out period comparator 52. The read-out pulse generator 51 is supplied with the read-out clock signal RCK and the external read-out pulse sequence ERP. The read-out pulse generator 41 is preset by each cell phase pulse of the external read-out pulse sequence ERP. The read-out pulse generator 41 generates an internal read-out pulse sequence IRP having a predetermined read-out period on the basis of each cell phase pulse of the external read-out pulse sequence ERP although any cell phase pulse of the external read-out pulse sequence ERP is not supplied thereto. When the external read-out pulse sequence ERP is normally or properly supplied to the internal read-out pulse generator 51, the predetermined read-out period is equal to the normal read-out period Trc. Instead of the external read-out pulse sequence ERP, the internal read-out pulse sequence IRP is supplied to the main control unit 12a.

The read-out period comparator 52 is supplied with the external read-out pulse sequence ERP and the internal read-out pulse sequence IRP. The read-out period comparator 52 compares the second period of the external read-out pulse sequence ERP with the predetermined read-out period of the internal read-out pulse sequence IRP. The read-out period comparator 52 produces a discard indication signal DI when the second period is shorter than the predetermined read-out period. The discard indication signal DI is delivered to the main control unit 12a.

The main control unit 12a is connected to the internal write-in pulse generator 41, the internal read-out generator 51, and the FIFO buffer 11. The main control unit 12a is supplied with the write-in clock signal WCK and the read-out clock signal RCK. The main control unit 12a controls the FIFO buffer 11 to write the write-in cell data WCD into the FIFO buffer 11 as the held cell data in response to the write-in clock signal WCK and the internal write-in pulse sequence IWP. The main control unit 12a also controls the FIFO buffer 11 to read the held cell data out of the FIFO buffer 11 as the read-out cell data RCD in response to the read-out clock signal RCK and the internal read-out pulse sequence IRP. In the manner which will later become clear, the main control unit 12a furthermore controls the FIFO buffer 11 to make the FIFO buffer 11 produce the read-out cell data RCD with excess data in the held cell data discarded in response to the discard indication signal DI.

In the similar manner which is mentioned above, the main control unit 12a recognizes the write-in cell number from the write-in clock signal WCK and the internal write-in pulse sequence IWP. In addition, the main control unit 12a recognizes the read-out cell number from the read-out clock signal RCK and the internal read-out pulse sequence IRP. The main control unit 12a compares the write-in cell number with the read-out cell number to detect the held cell number equal to the number of the cells in the held cell data which is held in the FIFO buffer 11. When the held cell number is equal to zero, namely, when the held cell data or the read-out cell data RCD is absent from the FIFO buffer 11, the main control unit 12a supplies the read-out selector 22 with the read-out selection signal RS.

Figure 4:
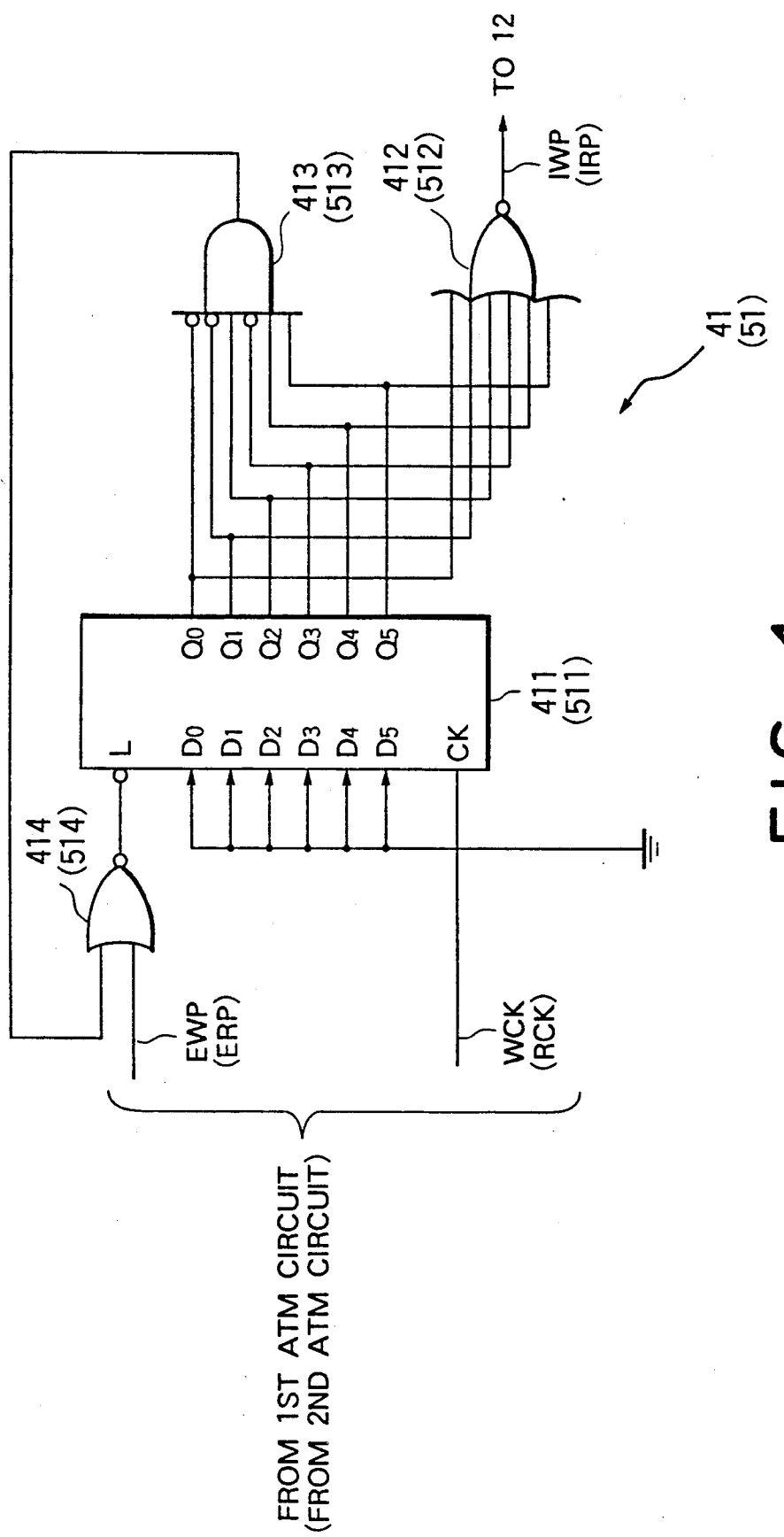
FIG. 4 is a block diagram of an internal write-in (read-out) pulse generator for use in the cell transmission phase and rate converting circuit illustrated in FIG. 3.

Turning to FIG. 4, the internal write-in pulse generator 41 comprises a counter 411, a first NOR gate 412, an AND gate 413, and a second NOR gate 414. It will be presumed that the fixed bit length is equal to a length of fifty-three bits.

The counter 411 has a clock input terminal CK, six data input terminals $D_0$, $D_1$, $D_2$, $D_3$, $D_4$, and $D_5$, a preset terminal L, and six data output terminals $Q_0$, $Q_1$, $Q_2$, $Q_3$, $Q_4$, and $Q_5$. The clock input terminal CK of the counter 411 is supplied with the write-in clock signal WCK. All of the data input terminals $D_0$ to $D_5$ of the counter 411 are grounded or put to earth. The data output terminals $Q_0$ to $Q_5$ of the counter 411 are connected to the first NOR gate 412 and the first AND gate 413. More specifically, the data output terminals $Q_0$ to $Q_5$ of the counter 411 produce zeroth through fifth output bits, respectively. The zeroth through the fifth output bits are supplied to the first NOR gate 412 as it is. The zeroth through the fifth output bits are supplied to the AND gate 413 with the zeroth, the first, and the third output bits inverted. Under the circumstances, the first NOR gate 412 produces a first NOR'ed signal as the internal write-in pulse sequence IWP of a logic "1" level when all of the zeroth through fifth output bits have a logic "0" level. The AND gate 413 produces an AND'ed signal of a logic "1" level when the zeroth through fifth output bits have logic "0", "0", "1", "0", "1", and "1" levels, respectively, namely, when the zeroth through the fifth output bits represent "52" in decimal.

The AND'ed signal is delivered from the AND gate 413 to the second NOR gate 414. The second NOR gate 414 is supplied with the external write-in pulse sequence EWP by the first ATM circuit. The second NOR gate 414 produces a second NOR'ed signal. The second NOR'ed signal is supplied to the preset terminal L of the counter 411 with the second NOR'ed signal inverted. In this event, the counter 411 is preset by either each cell phase pulse of the external write-in pulse sequence EWP or the AND'ed signal of the logic "1" level. As a result, the internal write-in pulse generator 41 generates the internal write-in pulse sequence IRP having the predetermined write-in period corresponding to the fixed bit length although any cell phase pulse of the external write-in pulse sequence EWP is not supplied thereto.

Likewise, the internal read-out pulse generator 51 comprises a counter 511, a first NOR gate 512, an AND gate 513, and a second NOR gate 514. Inasmuch as operation of the internal read-out pulse generator 51 is similar to that of the internal write-in pulse generator 41, description thereof will be omitted.

Turning to FIGS. 5 through 8, description will be made as regards operation of the cell transmission phase and rate converting circuit illustrated in FIG. 3. At first, write-in operation of the cell transmission phase and rate converting circuit will be described in conjunction with FIGS. 5 and 6. Read-out operation of the cell transmission phase and rate converting circuit will be described, in conjunction with FIGS. 7 and 8, later in the following.

Figure 5:
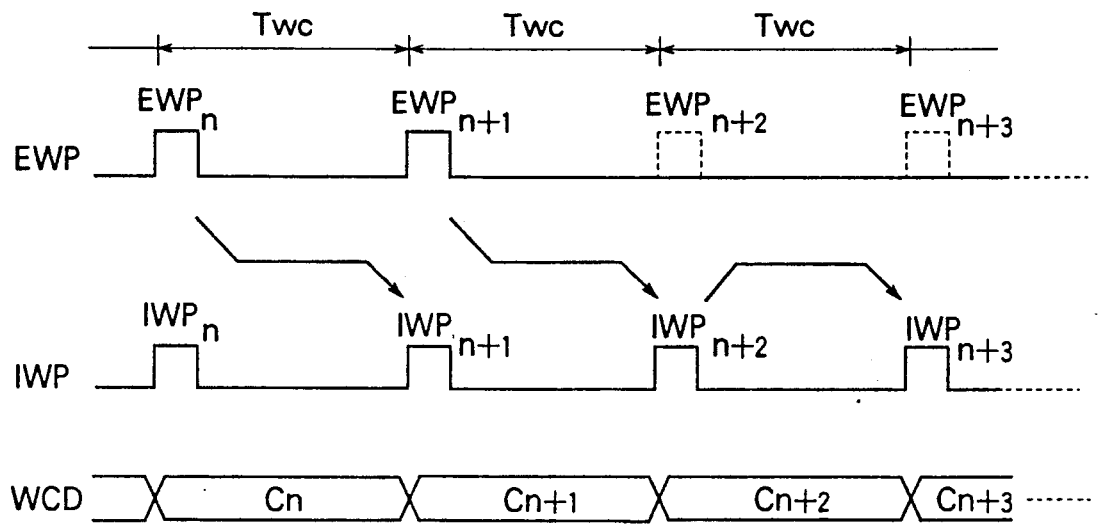
FIG. 5 shows a time chart for use in describing a write-in operation of the cell transmission phase and rate converting circuit illustrated in FIG. 3.
Figure 5:
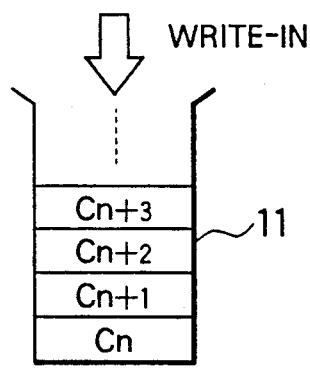

FIG. 5 shows a write-in operation of the cell transmission phase and rate converting circuit in a first fault case where either any cell phase pulse of the external write-in pulse sequence EWP is absent or the first period of the external write-in pulse sequence EWP is temporarily longer than the normal write-in period Twc. The external write-in pulse sequence EWP, the internal write-in pulse sequence IWP, and the write-in cell data WCD are depicted along first through third lines as labelled EWP, IWP, and WCD above an open arrow in FIG. 5. The FIFO buffer 11 is depicted below the open arrow.

In the example being illustrated, the external write-in pulse sequence EWP has normally the normal write-in period Twc such as an n−th and an (n+1)-th cell phase pulses $EWP_n$ and $EWP_{n+1}$ but an (n+2)-th and an (n+3)-th cell phase pulses $EWP_{n+2}$ and $EWP_{n+3}$ of the external write-in pulse sequence EWP are absent as shown in dotted lines of FIG. 5, where n represents an integer. The write-in cell data WCD comprises an n-th cell $C_n$, an (n+1)-th cell $C_{n+1}$, an (n+2)-th cell $C_{n+2}$, an (n+3)-th cell $C_{n+3}$, and so on. Although the (n+2)-th and an (n+3)-th cell phase pulses $EWP_{n+2}$ and $EWP_{n+3}$ of the external write-in pulse sequence EWP are absent, the internal write-in pulse generator 41 (FIG. 3) generates the internal write-in pulse sequence IWP having the predetermined write-in period equal to the normal write-in period Twc such as an n-th through an (n+3)-th cell phase pulses $IWP_n$, $IWP_{n+1}$, $IWP_{n+2}$, and $IWP_{n+3}$. Responsive to the write-in clock signal WCK and the internal write-in pulse sequence IWP, the main control unit 12a (FIG. 3) controls the FIFO buffer 11 to write the write-in cell data WCD into the FIFO buffer 11 as the held cell data with the held cell data divided into the n-th cells $C_n$, the (n+1)-th cell $C_{n+1}$, the (n+2)-th cell $C_{n+2}$, the (n+3)-th cell $C_{n+3}$, and so on.

Figure 6:
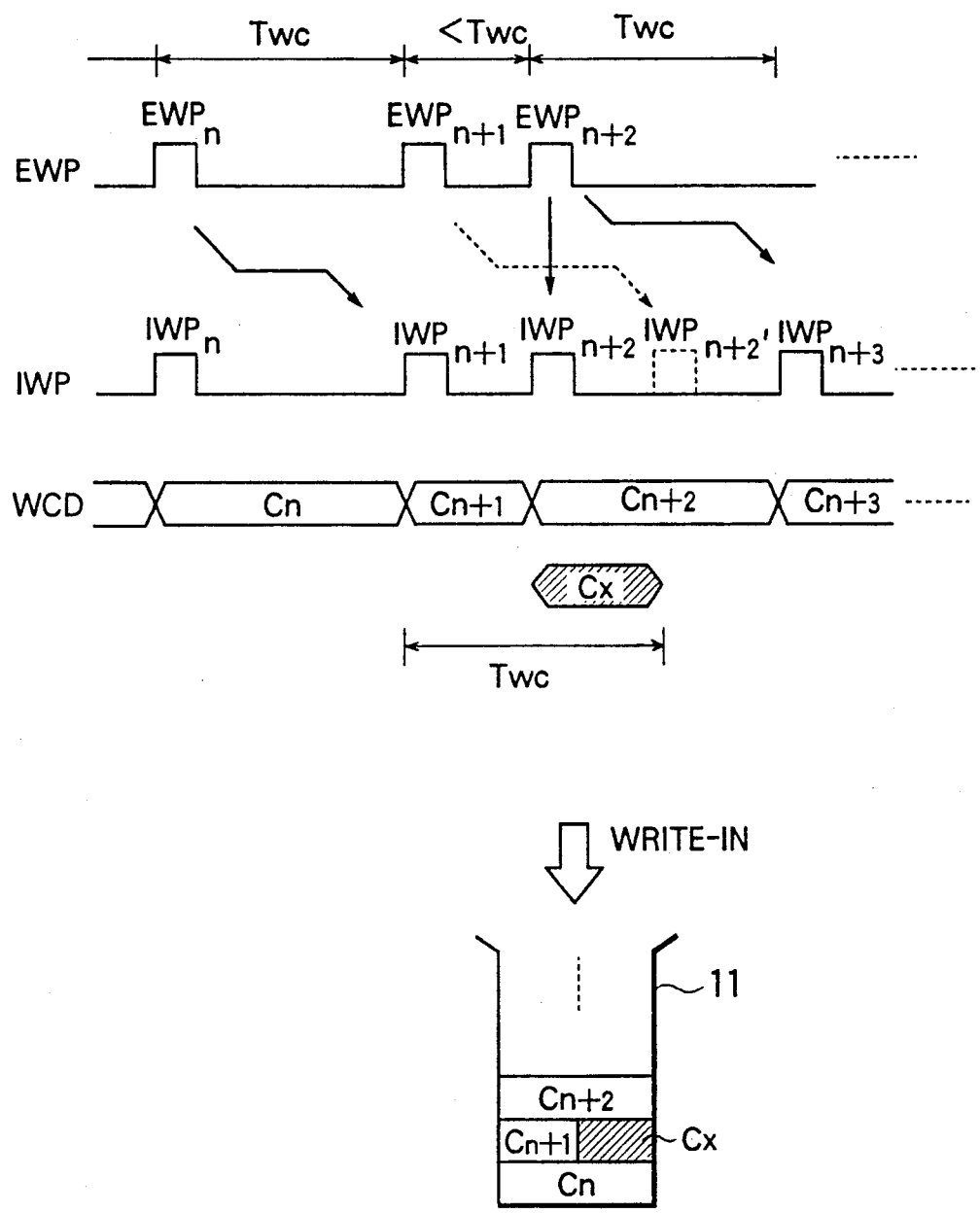
FIG. 6 shows a time chart for use in describing another write-in operation of the cell transmission phase and rate converting circuit illustrated in FIG. 3.

FIG. 6 shows another write-in operation of the cell transmission phase and rate converting circuit in a second fault case where the first period of the external write-in pulse sequence EWP is temporarily shorter than the normal write-in period Twc. As is similar to those of FIG. 5, the external write-in pulse sequence EWP, the internal write-in pulse sequence IWP, and the write-in cell data WCD are depicted along first through third lines as labelled EWP, IWP, and WCD above an open arrow in FIG. 6. The FIFO buffer 11 is depicted below the open arrow.

In the example being illustrated, the external write-in pulse sequence EWP has normally the normal write-in period Twc such as an n-th and an (n+1)-th cell phase pulses $EWP_n$ and $EWP_{n+1}$ but the external write-in pulse sequence EWP has a shorter period than the normal write-in period Twc such as the (n+1)-th and an (n+2)-th cell phase pulses $EWP_{n+1}$ and $EWP_{n+2}$. Responsive to the (n+1)-th cell phase pulse $EWP_{n+1}$, the internal write-in pulse generator 41 (FIG. 3) is about to generate an (n+2)-th cell phase pulse $IWP_{n+2}$, as depicted at a dotted line in FIG. 6. But the internal write-in pulse generator 41 is preset by the (n+2)-th cell phase pulse $EWP_{n+2}$ of the external write-in pulse sequence EWP to generate an (n+2)-th cell phase pulse $IWP_{n+2}$ as depicted at a solid line in FIG. 6 instead of the (n+2)-th cell phase pulse $IWP_{n+2}$, as depicted at the dotted line. A time interval between the (n+1)-th and the (n+2)-th cell phase pulses $EWP_{n+1}$ and $EWP_{n+2}$ of the external write-in pulse sequence EWP is shorter than the normal write-in period Twc. In other words, the (n+1)-th cell $C_{n+1}$ has a shorter bit length than the fixed bit length. In this event, the write-in period comparator 42 (FIG. 3) produces the write-in selection signal WS. Responsive to the write-in selection signal WS, the write-in selector 32 (FIG. 3) selects, as the write-in cell data WCD, the stuff cell data RC which is produced by the stuff cell producing circuit 31 and which is denoted by $C_x$ in FIG. 6. As a result, the write-in cell data WCD is written into the FIFO buffer 11 as the held cell data with the stuff cell data $C_x$ stuffed, as shown in FIG. 6.

Figure 7:
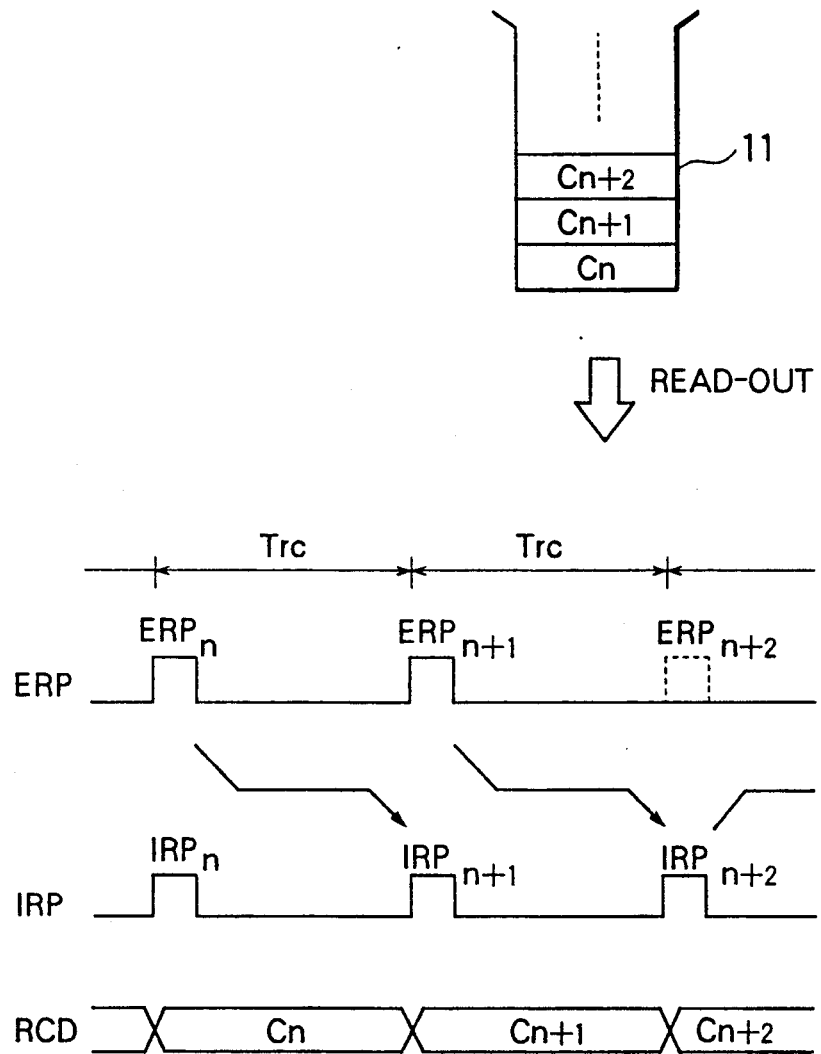
FIG. 7 shows a time chart for use in describing a read-out operation of the cell transmission phase and rate converting circuit illustrated in FIG. 3.

FIG. 7 shows a read-out operation of the cell transmission phase and rate converting circuit in a third fault case where either any cell phase pulse of the external read-out pulse sequence ERP is absent or the second period of the external read-out pulse sequence ERP is temporarily longer than the normal read-out period Trc. The FIFO buffer 11 is depicted above an open arrow in FIG. 7. Below the open arrow, the external read-out pulse sequence ERP, the internal read-out pulse sequence IRP, and the read-out cell data RCD are depicted along first through third lines as labelled ERP, IRP, and RCD in FIG. 7.

In the example being illustrated, the held cell data comprises an n-th cell $C_n$, an (n+1)-th cell $C_{n+1}$, an (n+2)-th cell $C_{n+2}$, and so on. The external read-out pulse sequence ERP has normally the normal read-out period Trc such as an n-th and an (n+1)-th cell phase pulses $ERP_n$ and $ERP_{n+1}$ but an (n+2)-th cell phase pulse $ERP_{n+2}$ of the external read-out pulse sequence ERP is absent as shown in a dotted line of FIG. 7. Although the (n+2)-th cell phase pulse $ERP_{n+2}$ of the external read-out pulse sequence ERP is absent, the internal read-out pulse generator 51 (FIG. 3) generates the internal read-out pulse sequence IRP having the predetermined read-out period equal to the normal read-out period Trc such as an n-th through an (n+2)-th cell phase pulses $IRP_n$, $IRP_{n+1}$, and $IRP_{n+2}$. Responsive to the read-out clock signal RCK and the internal read-out pulse sequence IRP, the main control unit 12a (FIG. 3) controls the FIFO buffer 11 to read the held cell data out of the FIFO buffer 11 as the read-out cell data RCD which comprises the n-th cell $C_n$, the (n+1)-th cell $C_{n+1}$, the (n+2)-th cell $C_{n+2}$, and so on.

Figure 8:
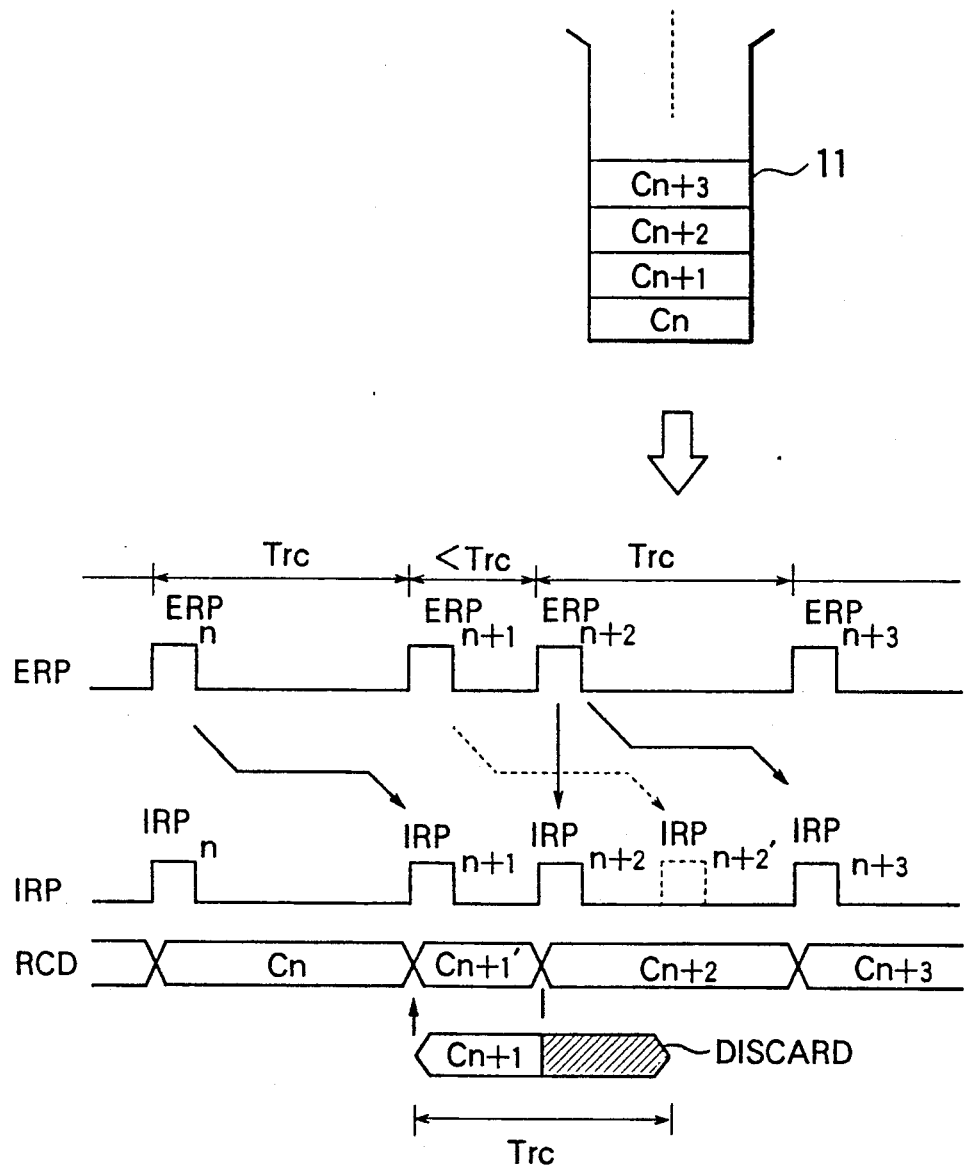
FIG. 8 shows a time chart for use in describing another read-out operation of the cell transmission phase and rate converting circuit illustrated in FIG. 3.

FIG. 8 shows another read-out operation of the cell transmission phase and rate converting circuit in a fourth fault case where the second period of the external read-out pulse sequence ERP is temporarily shorter than the normal read-out period Trc. As is similar to those of FIG. 7, the FIFO buffer 11 is depicted above an open arrow in FIG. 8. Below the open arrow, the external read-out pulse sequence ERP, the internal read-out pulse sequence IRP, and the read-out cell data RCD are depicted along first through third lines as labelled ERP, IRP, and RCD in FIG. 8.

In the example being illustrated, the external read-out pulse sequence ERP has normally the normal read-out period Trc such as an n-th and an (n+1)-th cell phase pulses $ERP_n$ and $ERP_{n+1}$ but the external read-out pulse sequence ERP has a shorter period than the normal read-out period Trc such as the (n+1)-th and an (n+2)-th cell phase pulses $ERP_{n+1}$ and $ERP_{n+2}$. Responsive to the (n+1)-th cell phase pulse $ERP_{n+1}$ of the external read-out pulse sequence ERP, the internal read-out pulse generator 51 (FIG. 3) is about to generate an (n+2)-th cell phase pulse $IRP_{n+2}$, as depicted at a dotted line in FIG. 8. However, the internal read-out pulse generator 51 is preset by the (n+2)-th cell phase pulse $ERP_{n+2}$ of the external read-out pulse sequence ERP to generate an (n+2)-th cell phase pulse $IRP_{n+2}$ as depicted at a solid line in FIG. 8 instead of the (n+2)-th cell phase pulse $IRP_{n+2}$, as depicted at the dotted line. A time interval between the (n+1)-th and the (n+2)-th cell phase pulses $ERP_{n+1}$ and $ERP_{n+2}$ of the external read-out pulse sequence ERP is shorter than the normal read-out period Trc. In this event, the read-out period comparator 52 (FIG. 3) produces the discard indication signal DI. Responsive to the discard indication signal DI, the main control unit 12a controls the FIFO buffer 11 to make the FIFO buffer 11 produce the read-out cell data RCD with excess data in the held cell data discarded, as depicted at hatched slant lines in FIG. 8.

What is claimed is:

1. A cell transmission phase and rate converting circuit for use in an asynchronous transfer mode communication system for carrying out transmission and exchange of cells between first and second asynchronous transfer mode circuits, said first asynchronous transfer mode circuit being operable in accordance with a first clock signal and a first cell phase pulse sequence, said second asynchronous transfer mode circuit being operable in accordance with a second clock signal and a second cell phase pulse sequence which are independent of said first clock signal and said first cell phase pulse sequence, respectively, each of said first and said second cell phase pulse sequences comprising a sequence of cell phase pulses, said first and said second cell phase pulse sequences having first and second periods, respectively, each of said cells being a packet having a fixed bit length, said first asynchronous transfer mode circuit producing, as first cell data, the cells in synchronism with said first clock signal and said first cell phase pulse sequence, said second asynchronous transfer mode circuit receiving, as second cell data, the cells in synchronism with said second clock signal and said second cell phase pulse sequence, said cell transmission phase and rate converting circuit being supplied with said first cell data as input cell data to produce said second cell data as output cell data, said cell transmission phase and rate converting circuit being supplied with said first clock signal and said first cell phase pulse sequence by said first asynchronous transfer mode circuit as a write-in clock signal and an external write-in pulse sequence, respectively, said cell transmission phase and rate converting circuit being supplied with said second clock signal and said second cell phase pulse sequence by said second asynchronous transfer mode circuit as a read-out clock signal and an external read-out pulse sequence, respectively, said cell transmission phase and rate converting circuit comprising a buffer which is supplied with input cell data as a write-in cell data and which produces a read-out cell data as said output cell data, said buffer holding said write-in cell data as held cell data to produce said held cell data as said read-out cell data, wherein the improvement comprises:

internal write-in pulse generating means supplied with said external write-in pulse sequence and preset by each cell phase pulse of said external write-in pulse sequence for generating an internal write-in pulse sequence having a predetermined write-in period on the basis of each cell phase pulse of said external write-in pulse sequence although any cell phase pulse of said external write-in pulse sequence is not supplied to said internal write-in pulse generating means;

internal read-out pulse generating means supplied with said external read-out pulse sequence and preset by each cell phase pulse of said external read-out pulse sequence for generating an internal read-out pulse sequence having a predetermined read-out period on the basis of each cell phase pulse of said external read-out pulse sequence although any cell phase pulse of said external read-out pulse sequence is not supplied to said internal read-out pulse generating means; and control means connected to said internal write-in pulse generating means, said internal read-out pulse generating means, and said buffer and supplied with said write-in and said read-out clock signals for controlling said buffer to write said write-in cell data into said buffer as said held cell data in response to said write-in clock signal and said internal write-in pulse sequence and to read said held cell data out of said buffer as said read-out cell data in response to said read-out clock signal and said internal read-out pulse sequence.

2. A cell transmission phase and rate converting circuit as claimed in claim 1, further comprising:

comparing means supplied with said external write-in pulse sequence and said internal write-in pulse sequence for comparing said first period of the external write-in pulse sequence with said predetermined write-in period of the internal write-in pulse sequence to produce a selection signal when said first period is shorter than said predetermined write-in period;

stuff cell producing means for producing stuff cell data; and selecting means connected to said stuff cell producing means, said comparing means and said buffer and supplied with said input cell data for selecting one of said input cell data and said stuff cell data as said write-in cell data, said selecting means selecting said input cell data as said write-in cell data when said selection signal is absent, said selecting means selecting said stuff cell data as said write-in cell data when said selection signal is present.

3. A cell transmission phase and rate converting circuit as claimed in claim 1, further comprising comparing means supplied with said external read-out pulse sequence and said internal read-out pulse sequence for comparing said second period of the external read-out pulse sequence with said predetermined read-out period of the internal read-out pulse sequence to provide said control means with a discard indication signal when said second period is shorter than said predetermined read-out period, whereby said control means, in response to said discard indication signal, controls said buffer to make said buffer produce said read-out cell data with excess data in said held cell data discarded.

* * * * *